(12) United States Patent
Biribauer et al.

(10) Patent No.: US 7,583,047 B2
(45) Date of Patent: Sep. 1, 2009

(54) QUENCHING DEVICE FOR A CONVERTER BRIDGE WITH LINE REGENERATION

(75) Inventors: Thomas Biribauer, Wien (AT); Franz Hackl, Wien (AT); Wilfried Hofmüller, Stockerau (AT); Heinz Pichorner, Pettendorf (AT); Wilhelm Ritschel, Wien (AT); Franz Wöhrer, Wien (AT)

(73) Assignee: Siemens AG Osterreich, Wein (AT)

( * ) Notice: Subject to any disclaimer, the term of this patent is extended or adjusted under 35 U.S.C. 154(b) by 302 days.

(21) Appl. No.: 11/632,517

(22) PCT Filed: Jul. 11, 2005

(86) PCT No.: PCT/EP2005/007492

§ 371 (c)(1),
(2), (4) Date: Jan. 16, 2007

(87) PCT Pub. No.: WO2006/005563

PCT Pub. Date: Jan. 19, 2006

(65) Prior Publication Data

US 2008/0084719 A1    Apr. 10, 2008

(30) Foreign Application Priority Data

Jul. 14, 2004    (AT) ............................. A1199/2004

(51) Int. Cl.
*H02P 7/42* (2006.01)
(52) U.S. Cl. .................. 318/801; 318/811; 363/40; 363/71
(58) Field of Classification Search ............ 363/34–41, 363/71, 58, 64, 68, 96, 135, 138; 318/400.34, 318/432, 434, 293, 431, 129, 400.22, 481, 318/479, 801, 809, 811
See application file for complete search history.

(56) References Cited

U.S. PATENT DOCUMENTS 5,038,244 A    8/1991    Tuusa

FOREIGN PATENT DOCUMENTS

| AT | 404 414 B | 9/1998 |
|---|---|---|
| CN | 1045667 A | 9/1990 |
| CN | 1154594 A | 7/1997 |
| DE | 26 42 412 B1 * | 1/1978 |
| DE | 30 30 186 A1 | 2/1982 |
| DE | 41 36 730 A1 | 5/1993 |
| DE | 195 39 573 A1 | 4/1997 |
| DE | 195 43 702 A1 | 5/1997 |
| EP | 0771064 A2 | 5/1997 |
| SU | 556 691 A | 11/1977 |
| SU | 1 005 252 A | 3/1983 |

* cited by examiner

*Primary Examiner*—Rajnikant B Patel

(57) ABSTRACT

There is described a method for controlling a quenching device for a converter bridge with line regeneration, whereby the converter bridge controlled by a network-timed control circuit by ignition pulses is connected with its three inputs to the phases of a three-phase network and the two outputs of the bridge are connected to a direct-current motor which feeds, when operated as a generator, current back to the three-phase network via the bridge. The quenching device is controlled by a trigger unit which emits trigger pulses depending on the monitoring of electrical and temporary variables. The quenching device comprises, for each bridge half, a quenching condenser that can be charged by a charging circuit quenching voltage. The quenching condensers, in the event of quenching, can be connected to the bridge halves by means of switches that are controlled by the trigger unit.

9 Claims, 1 Drawing Sheet

QUENCHING DEVICE FOR A CONVERTER BRIDGE WITH LINE REGENERATION

CROSS REFERENCE TO RELATED APPLICATIONS

This application is the US National Stage of International Application No. PCT/EP2005/007492, filed Jul. 11, 2005 and claims the benefit thereof. The International Application claims the benefits of Austrian application No. A 1199/2004 filed Jul. 14, 2004, both of the applications are incorporated by reference herein in their entirety.

FIELD OF INVENTION

The invention relates to a quenching device for a converter bridge with line regeneration which is activated with ignition pulses by a network-timed control circuit, and is connected with its three inputs to the phases of a three-phase network, and the two outputs of the bridge are connected to a DC motor, which feeds current back into the three-phase network via the bridge when operated as a generator, and the quenching device can be activated by a trigger unit, which is set up to emit trigger pulses depending on the monitoring of electrical and time-based values.

BACKGROUND OF INVENTION

In the case of network-controlled converters, as described, for example, in the applicant's AT 404 414 B, disturbances in the voltage or current, in particular overvoltages and/or commutation faults, can result in the destruction of the costly thyristors or switches of such a bridge.

In more precise terms, network-controlled converters are subject to the fundamental problem of inverter tripping in regenerative operation. Here, in the case of mains voltage drop and sufficient DC voltage, e.g. in the case of corresponding armature voltage of the motor, an overcurrent occurs, which increases still further, and can no longer be quenched by the converter itself. What happens then is the enforced actuation of the fuses which are provided to protect the thyristors. The consequence is lengthy downtime affecting the converter and the motor it supplies, as it takes a correspondingly long time to replace the fuses, which are customarily embodied as high-speed semiconductor fuses. Accordingly, efforts were made to create different, in some cases complex, devices to limit and interrupt the overcurrent or either to prevent inverter tripping, or terminate it in a controlled manner, as for example described in the said patent of the applicant.

DC current high-speed switches that lie in the DC current path are known, for example. If their secure functioning is to be guaranteed, however, highly controllable chokes are additionally required to limit the current rise, and the costs are correspondingly high, quite apart from the problem of dimensioning and the regular maintenance necessary for secure functioning.

Other methods for direct thyristor quenching with quenching condensers are known, for example the quenching of just one of the two halves of the converter bridge with one condenser, in which the motor current continues to exert a full load on the valves of the second bridge half, until complete reduction to zero, so that protective is not possible in all cases. A similar method is the quenching of both bridge halves with two condensers, and with a voltage limiter in each case parallel to these, although this allows overvoltages to occur in the motor. Furthermore, the named methods do not protect against overvoltage in the case of a mains outage if a transformer lies between the network and the converter bridge.

SUMMARY OF INVENTION

One object of the invention is the creation of a quenching device which is in a position to quench the thyristors of a feedback converter so rapidly that the semiconductor fuses upstream of the individual thyristors or the converter as a whole are protected against melting or premature damage (aging), in particular in the case of tripping of the inverter. Insofar as fuses are present, their melting integral ($i^2t$) should not be reached, while in the case of operation without fuses, the limit load integral ($i^2t$) of the thyristors must not be reached. In addition, the quenching device should protect the converter from overvoltages, as occur particularly in the case of network outages, especially during operation with a transformer, and which are frequently the cause of commutation faults and consequently lead to destruction of the thyristors.

This object is achieved with a quenching device of the type named at the outset, in which according to the invention the quenching device for each bridge half possesses a quenching condenser which can be charged to a defined quenching voltage by a charging circuit, and in the case of quenching, the quenching condensers can be connected to the bridge halves with the aid of switches actuated by the trigger unit.

In an advantageous embodiment it is provided for that in addition to controlled switches, diodes arranged in a six-pulse bridge circuit lie in the connections between the quenching condensers and the bridge points on the mains phases. The quenching condensers can here be charged via the diodes and connectable resistors. In this manner, the charging of quenching condensers is enabled without great additional effort.

It is further expediently provided for that commutator chokes are located in the connection between the quenching device and the DC-side bridge points, which limit the speed of current rise during the commutation process.

It is also expedient if the quenching device has a protective condenser for voltage limitation connected in parallel with which is a voltage limiter, the quenching condenser being connectable to the DC output of the bridge via controlled switches. This ensures that the components of the quenching device itself and the motor are protected against prohibited overvoltages.

Here, the protective condenser is optionally connectable to the DC output of the converter bridge via a bridge circuit made of controlled switches, in such a way that the polarity at the protective condenser and voltage limiter remains the same, regardless of the polarity of the DC output or the motor terminal voltage.

In an advantageous embodiment, the voltage limiter is embodied as a resistance chopper, in other words a ballast resistor of the necessary energy dissipation rate is continuously connected or disconnected as appropriate.

If the protective condenser is permanently connected to the DC side of the six diodes arranged in a bridge circuit via two diodes, all overvoltages originating from the network can be limited.

It is further sensible if the AC points of the converter bridge are connected to the inputs of the six diodes arranged in a bridge circuit via inductances. Such inductances, which can comprise either air-core coils or parasitic (line) inductances, prevent excessively rapid increases in current, which could endanger the bridge switches.

The quenching device is particularly suitable if the converters are thyristors.

BRIEF DESCRIPTION OF THE DRAWING

The invention, together with all its advantages, is explained in greater detail on the basis of an exemplary embodiment, as shown in the sole drawing. This shows, in a circuit diagram, a converter bridge actuated by a control circuit for supplying a DC motor, including a quenching device according to the invention with an associated trigger mechanism.

DETAILED DESCRIPTION OF INVENTION

Figure 1:
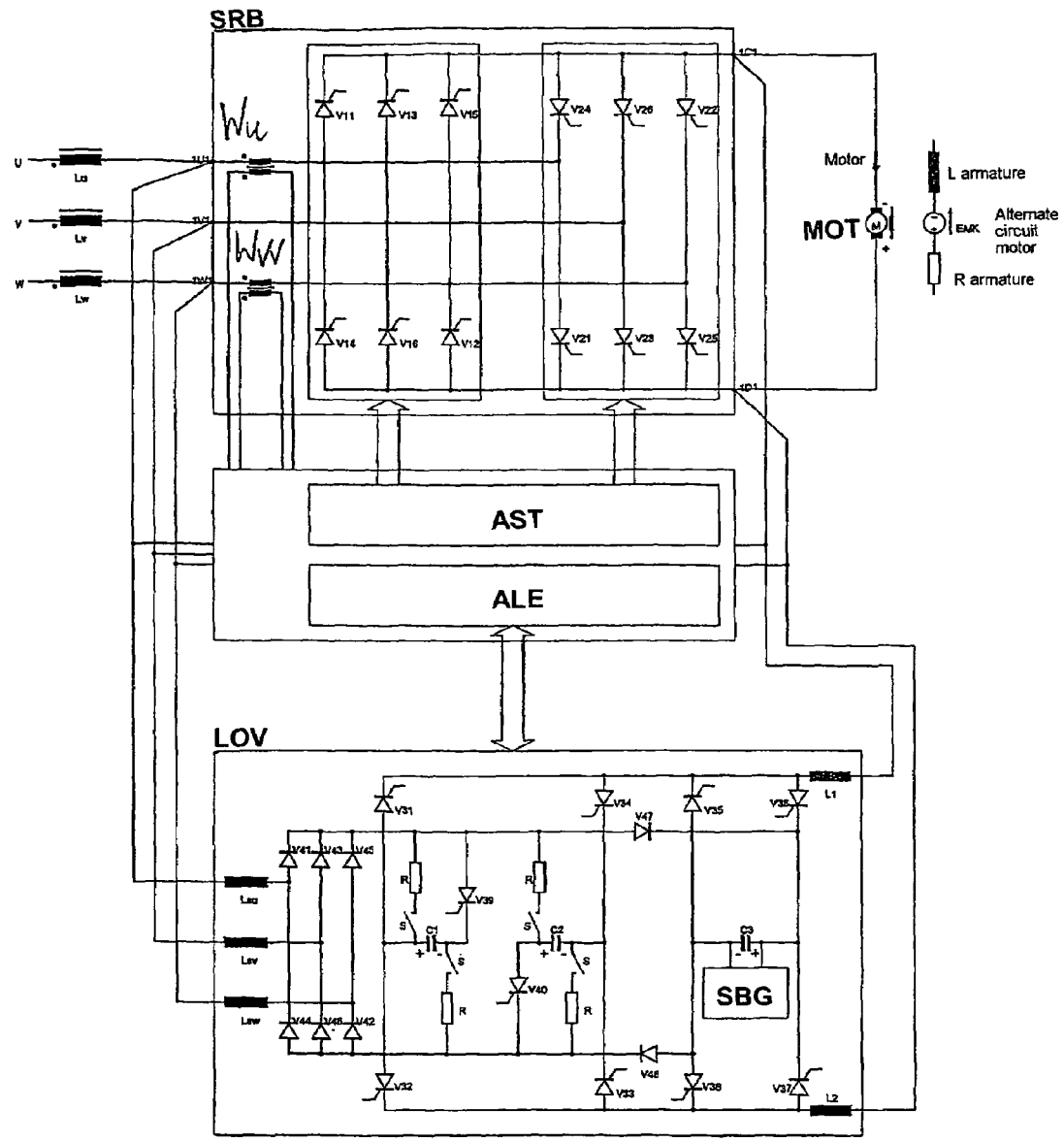

As can be seen from the drawing, the three phases U, V, W of a three-phase network are connected to the AC side of a converter bridge SRB via commutator chokes Lu, Lv, Lw. Here, a network fuse such as is described in AT 404 414 B in conjunction with its FIG. 2, and not shown in the drawing, customarily lies in each phase.

The controlled converter switches V1, . . . , V16 and V21, . . . , V26 are embodied as thyristors or similar components.

A control device AST is provided for both bridges, said control device serving to effect network-timed ignition of the thyristors. In a known manner, by shifting the timing of the ignition, it is possible to effect regulation of the rotational speed or moments. The three phase voltages of the network and the motor terminal voltage are fed to the control circuit AST, as are the phase currents, via two current transformers $W_u$, $W_w$, in order that the corresponding information for control and activation of the converter bridge is provided.

The two DC terminals 1C1, 1D1 of the bridge SRB are connected to a DC motor MOT, which feeds back into the AC network in generatoric operation via the bridge comprising the switches V11, . . . , V16. It should be noted here that in relation to the present invention only generatoric operation (the flow of power into the network) is of interest. The other bridges V21, . . . , V26 can also operate with regeneration, if the motor's EMF is reversed (requires reversed direction of rotation). For the sake of simplicity only the case where the bridge comprising the switches V1, . . . , V16 is currently providing line regeneration is examined. No problem requiring intervention aimed at quenching can occur in the bridge supplying current, whichever that might currently be. In concrete terms, in the event of a mains voltage drop in a bridge supplying current, a reduction in the current takes place. To aid further understanding, it should be pointed out here that the equivalent can be represented as the series circuit of the motor EMF, the armature inductance $L_{armature}$ and the armature resistance $R_{armature}$. The output current of the bridge SRMB corresponds to the rated motor current $I_{armature}$.

The quenching device LOV embodied and operating according to the invention has, for each bridge half V11, V13, V15 or V14, V16, V12 (in the case of reversed EMF, for V21, V23, V25 or V24, V26, V22) a quenching condenser C1 or C2, each of which, as is further described below, is charged to the specified polarity. The plus or as the case may be minus pole of the condensers C1 and C2 is connected to the DC connections 1C1 and 1D1 of the converter bridge SRB via thyristors V31, V32 and V34, V33 in the manner shown, in the present case by means of commutatator chokes L1, L2. The minus pole of C1, or as the case may be the plus pole of C2 is connected to the AC connections 1U1, 1V1, 1W1 of the converter bridge SRB via a thyristor V39 and three diodes V41, V43, V45, or, respectively, via a thyristor V40 and three diodes V44, V46, V42. Chokes $L_{SU}$, $L_{SV}$, $L_{SW}$ inserted in the connections limit the increase in current, and may take the form of air-core coils or parasitic (line) inductances.

The quenching device according to the present invention further has a protective condenser C3, in parallel with which is connected a voltage limiter SBG. The minus pole of the protective condenser C3 is connected to the DC terminals 1C1, 1D1 of the bridge SRB via the thyristors V35, V36, while the plus pole is connected via the thyristors V38, V37. It should be noted that, in contrast to the quenching condensers C1, C2, the protective condenser C3 is always subject to the same polarity, and that the thyristors V35, . . . , V38 can also be replaced by diodes, if the sum of the charging voltages of C1 and C2 is smaller that the bias voltage of C3.

The DC side of the diodes V41, . . . , V46 arranged in a bridge circuit is connected to the input of the voltage limiter SBG and the protective condenser C3 via diodes V47 or V48 respectively. During the course of the quenching process, they permit reduction of the current in the commutator chokes on the one hand, and where the converter bridges are operating normally (motoric and generatoric), the handling of transient overvoltages from the network and commutation voltage spikes from the converter itself.

There follows initially an explanation of the quenching process (for the polarity of the motor EMF specified in the drawing), where, according to the drawing, charged quenching condensers C1, C2 are assumed. Their charging is subsequently explained below.

Upon ignition of the quenching thyristors V31, V33 and V39, V40 by the trigger unit ALE, the currents from the upper bridge half V11, V13, V15 commutate into the condenser C1, and those from the lower bridge half V14, V16, V12 into the condenser C2, by means of which all currents in the supplying converter V11, . . . , V16 are immediately quenched. Simultaneously with the emission of the quenching pulses (ignition pulses for the quenching thyristors), the ignition pulses for the bridge SRB are also blocked.

The voltages at the condensers C1, C2 reverse as a result of the motor current, until the latter commutates into the condenser C3 located in the voltage limiter SBG via the recently ignited thyristors V35 and V37. If the voltage at C3 has not yet attained the limiting level of the limiter SGB, it is charged up to this level by the motor current. It should be noted here that currents flow through the thyristors V32, V34, V36 and V38 only in the case of reversed motor EMF.

There follows a more detailed examination of the voltage limiter SBG and its function, based on the assumption that the polarity of the motor voltage (voltage at the motor of device terminals) is briefly reversed (for about 1 ms) by the quenching process. Once the original motor voltage is reached again, the motor current increases slightly compared with its initial value at the point of quenching. The current in the armature inductance of the motor is only reduced to zero by means of a higher voltage, and this voltage must be regulated by means of the voltage limiter SBG with the aim of limitation to a maximum value.

The limitation takes place in a known manner by means of a controlled connection of ballast resistors to the input terminals of the limiter SBG and thus to the protective condenser C3. Depending on the voltage level, the ballast resistors are switched on at a different clock rate, electrical energy being converted into heat energy. De facto, for example, a two-point regulator with about 10% hysteresis is present, which switches the ballast resistors on and off. In order to enable a higher total quenching voltage, the voltage limiter SBG can only be connected during the reversal of the condensers C1, C2 via the thyristors V35, . . . , V38. Four diodes could also be used here, but since these would necessarily form a bridge converter with C3, the specified total quenching voltage at the start of rectification would exceed the value of the current voltage of C3, and cause a considerable (unlimited/damaging) power surge. For this reason, four thyristors are employed which are fired at around the time of the zero crossing of the condenser voltages C1 and C2. The danger therefore no longer exists, because the motor current, which as already described above commutates into the limiter, is prescribed (or is marked or more or less constant). The condenser C3 designated as the protective condenser could also be dispensed with if another limiter SBG is used, in which case voltage-dependent resistors or zener diodes could be considered.

The voltage limiter SBG is, however, permanently connected to the diode bridge V41, 46 via the diodes V47, V48. This enables all overvoltages originating from the network to be limited too. Considerable overvoltages can, for example, occur when switching off a series-connected transformer under loading.

In order to avoid a continuous power loss at the named resistors of the voltage limiter SBG, the latter may have a further switch with a somewhat lower voltage threshold, where the clocked ("chopped") resistors or one resistor have or has a significantly higher resistance than the rated values of the voltage limiter.

It should be noted here that, in a practical embodiment for example, the chopped resistor effectively has 250 mOhm. Realization takes place in parallel by means of four IGBT switches and four resistors, each of 1 Ohm. In the case of limitation, a current of 900 A flows through each resistor.

The two quenching condensers C1, C2 must be charged to a proportion—typically 0.5 to 0.9—of the peak value of the interlinked mains voltage. The two condensers C1 and C2 are charged in reverse after a quenching process. Therefore as a result of the circuitry described below, strictly speaking discharging to zero first takes place, only then followed by charging. For the principle of the invention, the manner in which charging of the two condensers takes place is immaterial, but there follows a description of a proven charging circuit arrangement, integrated into the overall circuitry for the quenching device. For each condenser C1 or C2, this has two charging resistors R1, R2 or R3, R4 respectively, which lead to the plus pole R1, R3 or the minus pole, R2, R4 of the bridge circuit V41, . . . , V46. Switches S1, S2 for C1, and S3, S4 for C2, which are arranged in series with the charging resistors R1, R2 and R3, R4, are controlled by a two-point regulator (not shown). Charging is only possible if the quenching thyristors are switched off. Furthermore, this circuit serves to prevent double voltage loading on the thyristors V31 and V33 or V32 and V34 respectively.

In the case of quenching, immediately after ignition of the quenching thyristors during the reversal of the voltages to the quenching condensers C1 and C2, these must be separated from the charging circuit by the aforementioned semiconductor switches S1 . . . S4, in order to prevent the quenching thyristors from remaining conducting after successful current degradation by the charging current. This would in fact prevent a further charging process, resulting in overloading of the charging resistors R1, . . . , R4. As soon as the condensers C2 and C2 are sufficiently charged once more, a new quenching process can take place, however with the frequency of repetition of quenching processes or the number of quenching processes within a specific period of time being determined by the dimensioning of the circuit, in particular of the charging resistors and the voltage limiter.

Control of the circuit as a whole, which is not the direct subject matter of the present invention, can be effected by means of an analog circuit with microprocessor support for communication with the converter. The triggering criteria for activation of the quenching thyristors are determined by the software on the basis of measured voltages and currents and/or times. Even if, as stated, the invention does not relate to this, some examples of (faulty) operating statuses are provided which can be rectified by the inventive quenching device.

In the case of lightning strikes in high or medium voltage facilities, spark gaps or gas-filled overvoltage protective elements are fired. They then burn until the next current zero crossing. This results in a low-impedance mains voltage drop lasting between 3 and 20 ms. However it is also possible for a longer mains voltage drop to arise, in which one or more transformers or other loads keep the network to low impedance at zero.

In the case of a short circuit affecting a parallel electrical circuit in the same network, a mains voltage drop first occurs, after which the corresponding fuse melts, separating the faulty electrical circuit from the network. In this way a short overvoltage pulse then occurs, the duration and strength of the outage being dependent on the network impedance and the residual current.

Further possible low-impedance network outages are all kinds of short circuits in the supply network.

In the case of the examples cited, all of which relate to low-impedance mains failures, and simultaneous feedback into the same network via the converter, the motor current increases according to the EMF, and the armature inductance plus network impedance, until the trigger unit requires the quenching device to shut down. The average turn-off time, in other words the time until the motor current has sunk to zero, is around 5 ms. Any overvoltage peaks at mains OK are limited as described above.

When switching off a main contactor directly ahead of the converter, it must be possible for the commutation inductances and armature inductance to discharge. This is achieved as already described by means of the continuously acting network voltage limitation. No inverter tripping takes place here without such a voltage limiter, but cross-ignition usually occurs. The reduction in power mainly arises in the main contactor, which is to be avoided, however, because of the contact wear alone.

When shutting down a supply transformer, for example at medium voltage level, the higher internal resistance of the network brings about no significant increase in current (in the case of inverter tripping). However certain thyristors in the converter no longer quench, thereby resulting in cross-ignition. This condition is likewise detected in a timely manner, and the quenching device initiates shutdown of the current. Any overvoltages occurring through demagnetization of the specified transformer are in turn limited by the quenching device (diode bridge V41, . . . , V46 via V47, V48 to C3 in parallel with the voltage limiter).

The invention claimed is:

1. A quenching device for a converter bridge with line regeneration, the converter bridge which is activated with ignition pulses by a network-timed control circuit and having three inputs connected to the phases of a three phase network and having two outputs connected to a DC motor that injects current into the three-phase network when operated as a generator, where the quenching device is activated by a trigger unit configured to emit trigger pulses, comprising:

at least a pair of quenching condensers, each condenser of the pair of quenching condensers assigned to a bridge half and chargeable to a defined quenching voltage by a respective charging circuit;

a plurality of switches that connect the quenching condensers to the respective assigned bridge halves, wherein the plurality of switches connect the quenching condensers to the respectively assigned bridge halves based on activation by the trigger unit;

a plurality of diodes arranged in a six-pole bridge circuit in the connections of the quenching condensers where points of the bridge are connected to the phases of a three phase network; and a protective condenser connected in parallel circuit with a voltage limiter and connectable to a DC output of the bridge via controlled switches, wherein:

the protective condenser is permanently connected to the DC side of the six diodes arranged in a bridge circuit via two diodes.

2. The quenching device as claimed in claim 1, wherein the quenching condensers are chargeable via the diodes and a plurality of connectable resistors.

3. The quenching device as claimed in claim 2, wherein a commutator choke is arranged between the quenching device and the a DC side bridge points.

4. The quenching device as claimed in claim 3, wherein the protective condenser is switchable to the DC output of the converter bridge via a bridge circuit comprising controlled switches such that the polarity at the protective condenser and voltage limiter remains the same, regardless of the polarity of the DC output or the motor terminal voltage.

5. The quenching device as claimed in claim 4, wherein the voltage limiter is a resistance chopper.

6. The quenching device as claimed in claim 5, wherein the AC points of the converter bridge are connected to the inputs of the six diodes arranged in a bridge circuit via inductances.

7. The quenching device as claimed in claim 6, wherein the inductances are air-core coils or parasitic inductances.

8. The quenching device as claimed in claim 7, wherein the converters are thyristors.

9. A quenching device for a converter bridge with line regeneration, the converter bridge activated with ignition pulses by a network-timed control circuit and having three inputs connected to the phases of a three phase network and further having two outputs connected to a DC electromotive machine that injects current into the three-phase network when operated as a generator, where the quenching device is activated by a trigger unit configured to emit trigger pulses, comprising:

at least a pair of quenching condensers, each condenser of the pair of quenching condensers assigned to a bridge half and chargeable to a defined quenching voltage by a respective charging circuit;

a plurality of switches that connect the quenching condensers to the respective assigned bridge halves, wherein the plurality of switches connect the quenching condensers to the respectively assigned bridge halves based on activation by the trigger unit;

a plurality of diodes arranged in a six-pole bridge circuit in the connections of the quenching condensers where points of the bridge are connected to the phases of a three phase network; and a protective condenser connected in parallel circuit with a voltage limiter and connectable to a DC output of the bridge via controlled switches, wherein the protective condenser is switchable to the DC output of the converter bridge via a bridge circuit comprising controlled switches such that the polarity at the protective condenser and the voltage limiter remains the same regardless of the polarity of the DC output or the electromotive machine terminal voltage.

\* \* \* \* \*